UNITED STATES PATENT OFFICE.

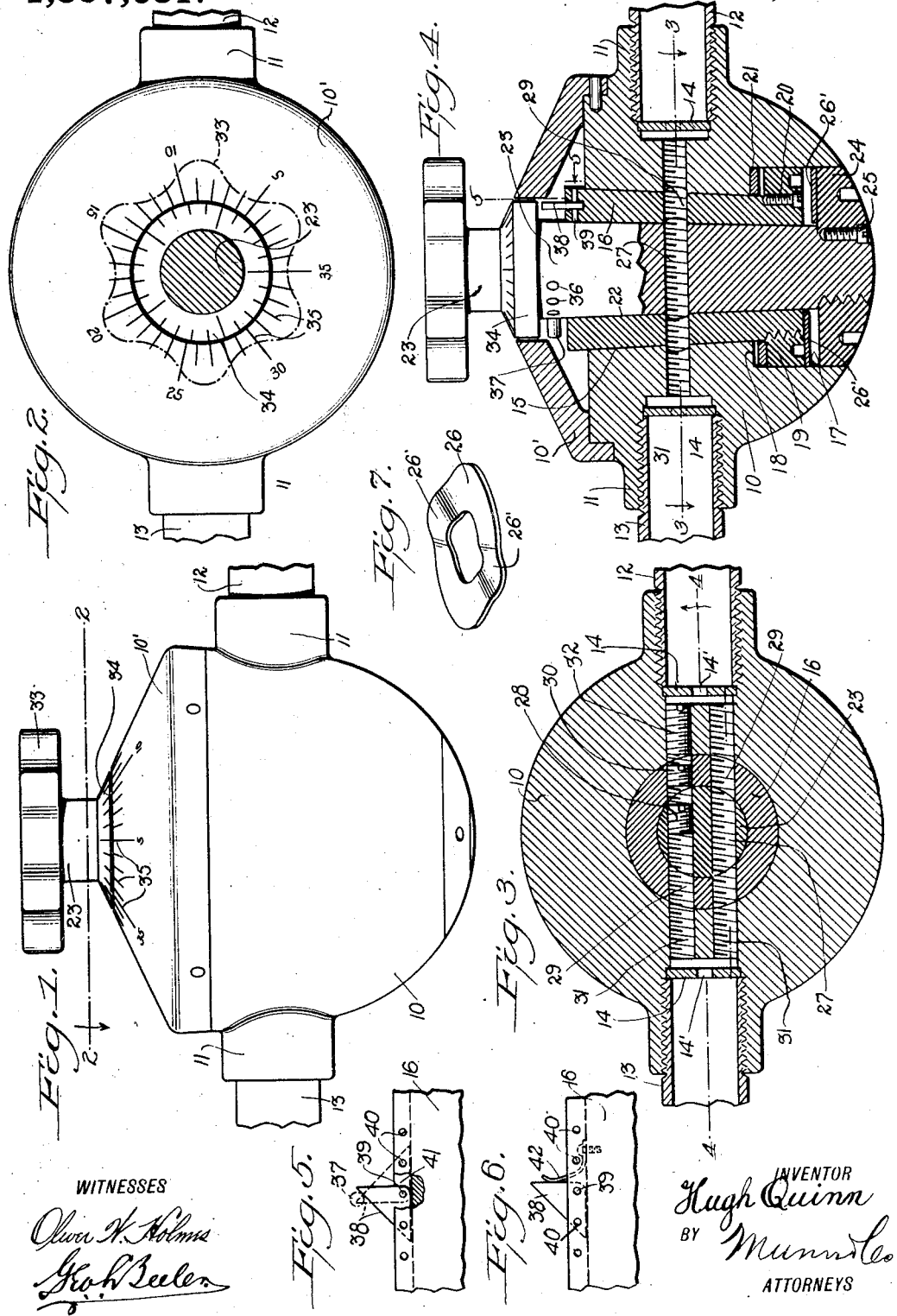

HUGH QUINN, OF BROOKLYN, NEW YORK.

PERMUTATION-VALVE.

1,357,081.  Specification of Letters Patent.  Patented Oct. 26, 1920.

Application filed June 6, 1919. Serial No. 302,140.

*To all whom it may concern:*

Be it known that I, HUGH QUINN, a citizen of the United States, and a resident of the city of New York, borough of Brooklyn, in the county of Kings and State of New York, have invented a new and Improved Permutation-Valve, of which the following is a full, clear, and exact description.

This invention relates to means for controlling the flow of a fluid through a pipe in such a manner as to render it practically impossible for any unauthorized person to cause or permit the flow of a liquid if the owner or authorized person desires to prevent the same.

More definitely stated the invention constitutes in effect a permutation lock for the passage of the fluid along a pipe or tube, and among its many fields of usefulness it is well adapted for the control of the flow of liquid fuel such as gasolene in connection with a motor vehicle.

Another object of the invention is to provide a fluid lock in the form of a rotatable valve plug having facilities for setting the same for opening of the valve at any desired points, assuming that it be desirable to change the combination from time to time.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improved valve structure.

Fig. 2 is a plan view of the same, but with the valve stem in section on the line 2—2 of Fig. 1.

Fig. 3 is a horizontal section on the line 3—3 of Fig. 4.

Fig. 4 is a vertical section on the line 4—4 of Fig. 3.

Fig. 5 is a detail view substantially on the line 5—5 of Fig. 4.

Fig. 6 is a similar view, but indicating a slight variation; and

Fig. 7 is a detail perspective view of one of the valve plug washers.

Referring now more specifically to the drawings I show a valve structure including a body 10 having hubs 11 into which pipe sections 12 and 13 are connected for the conveyance of fluid through the body. Each pipe section is secured in place abutting against a gasket or washer 14 having a central hole 14′. These washers constitute baffles for deflecting the course of the fluid passing through the valve structure. In other words while the holes 14′ are shown and described as being central it is to be understood that they are so located that the passageway for the fluid through the valve is offset from the holes so as to prevent any one from maliciously tampering with the adjustable portions of the valve.

The body 10 is provided with a tapered or conical hole 15 constituting a seat for a valve sleeve 16. The smaller end of the sleeve 16 projects into a recess or counterbore 17 in the bottom or at one side of the body 10 forming a shoulder 18. Said end of the sleeve is externally threaded to receive a nut 19 which may be suitably adjusted from time to time and locked by means of a screw 20 so as to maintain a proper degree of tightness of the sleeve in coöperation with a washer 21 located between the nut and the shoulder 18. This washer is of considerable thickness and is provided on one or more side portions with convex bends such as shown in Fig. 7 and being made of flexible material constitutes a cushion to resiliently hold the sleeve forced into the tapered seat.

The sleeve 16 has a central tapered bore 22 constituting a seat for a similarly formed valve plug 23 whose smaller end is externally threaded and projected into the outer portion of the counterbore 17 and upon which is fitted a nut 24 suitably adjusted and locked by means of a screw 25. This nut bears against a washer 26 (see Fig. 7) of a character similar to the above description of the washer 21 and having bends 26′ formed in diametrically opposite sides and in opposite directions from the plane of the washer. This washer 26, however, is sufficiently more flexible than the washer 21 for it to influence the valve plug into its seat independently of the action of the washer 21 in forcing the sleeve into its seat. In other words while the washer 26 reacts against the nut 19 or the sleeve the strength of the spring 21 is sufficient to prevent the unseating of the sleeve due to such reaction of the washer 26.

Any suitable arrangement of transverse ports in the valve body, sleeve and plug may be provided to establish communication between one pipe portion 12 and the other 13. To this end I show in Figs. 3 and 4 the plug 23 provided with a plurality of ports 27 shown parallel to each other and on opposite sides and spaced from one horizontal diameter of the plug. These ports are internally threaded so that either of them may be closed by means of a threaded plug 28. The sleeve 16 is similarly bored to form ports 29 adapted in one position of the valve to register with the ports 27. These ports 29 are preferably screw threaded and any of them may be closed by a plug or plugs 30 similarly threaded. The body adjacent to the pipe ends 12 and 13 is bored at 31 which also are adapted to register with the ports 27 and 29 in one position of the valve. 32 indicates a plug adapted to be screwed into any of the ports 31. As shown in Fig. 3 I provide three of these plugs 28, 30 and 32 screwed into the same series of registering holes or ports to close the same and leaving the other series of ports 27, 29 and 31 adapted to establish open communication between the barriers 14, but as stated above the ports 14' through the barriers are offset from the open ports through the valve body and plugs.

As so constructed and described the sleeve 16 must have a specific position with respect to the body 10 in order to establish free communication along the series of ports. The valve plug 23 is provided at its upper end with any suitable knob or handle 33 whereby the plug may be freely rotated in either direction. Beneath the knob the plug is provided with a collar 34 having any suitable indicating marks thereon for coöperation with a series of marks or a scale 35 formed on the cap 10' directly surrounding the collar. Below the collar is provided a series of holes 36 into any one of which a pin 37 is fitted. To the upper edge of the sleeve 16 is provided a tiltable dog 38, the pivot 39 of which is horizontal and radial with respect to the plug and adjustable along a series of holes 40 formed in said upper edge of the sleeve. This edge is provided with a longitudinal groove 41 in which the pivoted portion of the dog is fitted and held from lateral movement. This dog is shown as of a substantially right angle triangular form and consequently has one vertical side always exposed and having the upper end or point thereof lying in the path of the pin 37. As indicated in Fig. 5 the dog if struck upon the vertical side by the pin will not tilt on its pivot, but if struck on the inclined side by the pin it will tilt so as to rest upon the other side of the right angle. In the form in Fig. 6 a spring 42 acts upon the dog to hold it always so that a particular side will be impinged against by the pin so that if the pin strikes the inclined side the dog will tilt only far enough to allow the pin to pass over idly when the spring will throw the dog back to its original position.

From the foregoing specific description of the mechanism its mode of operation may be briefly set forth as follows: The operator may freely turn the plug 23 by use of the knob 33 in either direction. A certain portion of this rotation may be made without moving the sleeve. By reference to Fig. 6 it will be noted that the knob and plug may be given a turn to the left or counter clockwise indefinitely without moving the sleeve since the pin 37 will ride idly over the dog 38 in such a direction and the dog will always stand in the same position by virtue of the spring 42. In the form of Fig. 5 the dog 38 if standing in the position of the full lines will first be tilted over to the dotted line position and on the next turn of the plug in the same direction the then upstanding point will be struck by the pin and the sleeve will be caused to turn in the same direction. Unless the dog be struck on a vertical side by the pin the sleeve will not be turned by the rotation of the plug. This is assured by the fact that the washer 21 is so much superior in strength to the washer 26. Assuming now that the operator knowing the numerical position on the scale 35 to which the sleeve must be adjusted to cause its ports 29' to register with the ports 31, he will turn the plug in the proper direction and to a certain distance according to the design of the lock to bring the sleeve into such proper registering position. He will then rotate the plug in the opposite direction so as to bring the index point thereof opposite another certain and known graduation mark on the scale 35 to properly position the plug so as to cause its port 27 to register with the previously registered ports. Thus it will be seen that by the rotation of the same member several different sets of ports may be made to register in accordance with the design of the lock or the purpose of the lock maker. By providing duplicate ports arranged parallel to each other on opposite sides of the center of the structure it is relatively easy to change the combination in case the given combination becomes known to undesired persons. For example assuming that all other parts are in register and the plug 23 becomes set in open position at a certain point on the scale 35 the operator may easily change the combination by removing the plug 28 from the one port 27 and inserting it into the other port 27. This will necessitate the positioning of the plug so as to register with the diametrically opposite point on the scale 35 from the previous adjustment. Likewise each of the other plugs 30 and 32 may be severally interchanged in their ports 29 and 31 respectively or any combination of the three plugs may be interchanged. Taking into account therefore the multitude of different combinations that may be effected by changing the position of either the pin 27 or the dog 38, or both, without changing any of the plugs, the number of possible combinations including the changes of the plugs becomes practically indefinite. Another advantage of the device is that the sleeve 16 and all parts coöperating therewith are fully hidden within the body structure, and any one without taking the lock apart is unable to ascertain the combination.

In the operation of this improvement no tool key or wrench is required for operating the valve. It is to be noted also that the spanner holes in the nut 24 may be plugged by means of solder or other means thereby rendering the disassembly of the valve structure, by one not informed as to its construction, very difficult.

I claim:

1. In a permutation valve, the combination of a body and a plug rotatable therein around a certain center, said body having a port extending therethrough at one side of said center and the plug having a plurality of independent ports adapted to register in alternation with the body port, and means to close one of the plug ports.

2. In a permutation valve, the combination of a body, a valve plug rotatable therein around a certain axis, the body having a port extending therethrough at one side of said axis, the valve plug being provided with a plurality of independent ports one of which is adapted to register with the body port, and removable means fitted in the other port of the valve plug to obstruct communication therethrough, substantially as set forth.

3. In a permutation valve, the combination of a body, a valve sleeve rotatable in the body, a valve plug rotatable in the sleeve, said body having a port at one side of the axis of the sleeve and plug, the sleeve having a port adapted to register with the body port and the valve plug having a port adapted to register with the aforesaid ports, means to rotate the plug independently of the sleeve, and means to cause rotation of the sleeve from the plug.

4. In a permutation valve, the combination of a body having a valve seat bore and a plurality of fluid ports transverse thereto and eccentric to the axis of the bore, tubes leading toward and from the body, baffle means between the tubes and the body having ports therethrough in staggered relation to the ports of the body, and valve means journaled in the bore and having at one side of its center a transverse port adapted to register with either of the body ports.

5. In a permutation valve, the combination of a body having a bore constituting a valve seat, a valve sleeve fitted in said bore for rotation, friction means tending to resist such rotation, a valve plug journaled in the sleeve for a certain amount of rotation independently of the rotation of the sleeve, said body, sleeve and plug being provided with transverse ports adapted to register with one another in certain predetermined positions, said sleeve and plug being provided with relatively fixed and movable members whereby rotation of one of the valve members will cause rotation of the other valve means by contact between said fixed and movable members, and whereby both rotatable valve members may be adjusted as a result of the rotation of one of them.

6. In a permutation valve, the combination of a body, concentric sleeve and plug means rotatable within the body, one of said means being provided with a pivoted dog and the other with a pin for positive coöperation whereby the rotation of one will cause the rotation of the other, said body, sleeve and plug being provided with ports eccentric to the axis of the valve, means adapted to register with one another in a certain definite position of rotation, and means tending to prevent rotation of one of the valve means while the other is rotated independently.

HUGH QUINN.